Jan. 12, 1965 R. C. TABORDON 3,165,142
TIRE CHANGING STAND
Filed April 15, 1963 4 Sheets-Sheet 1
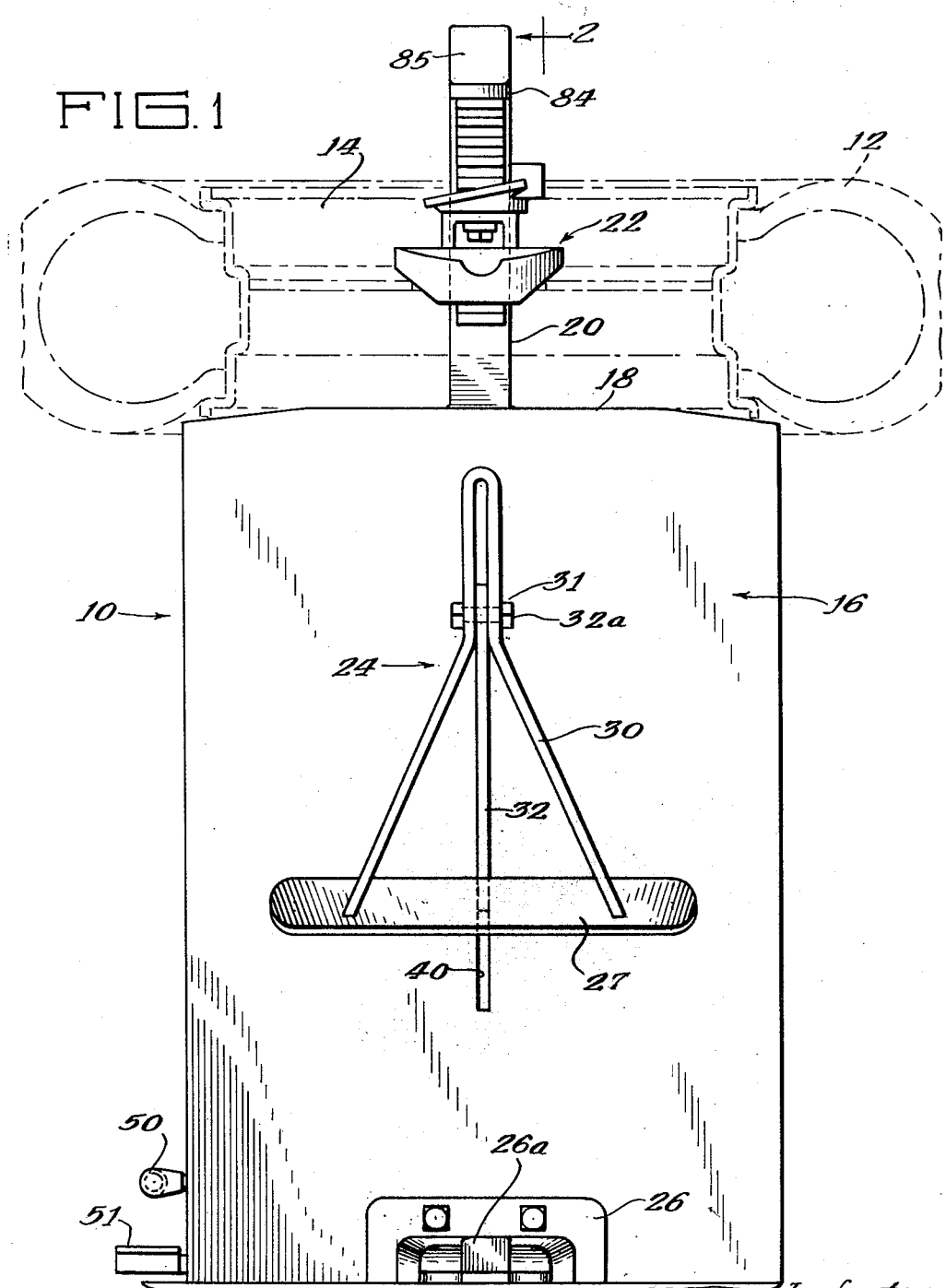

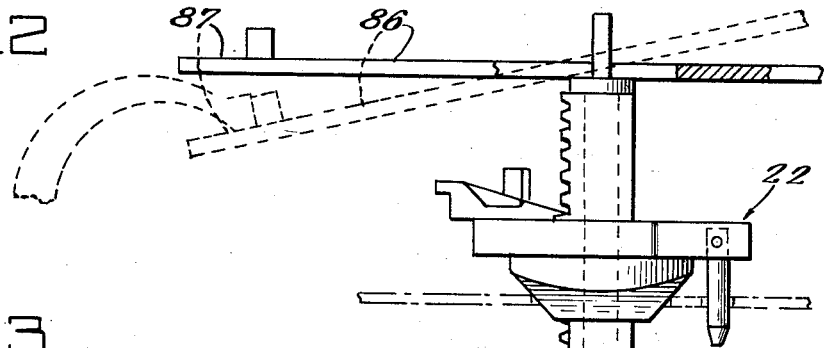
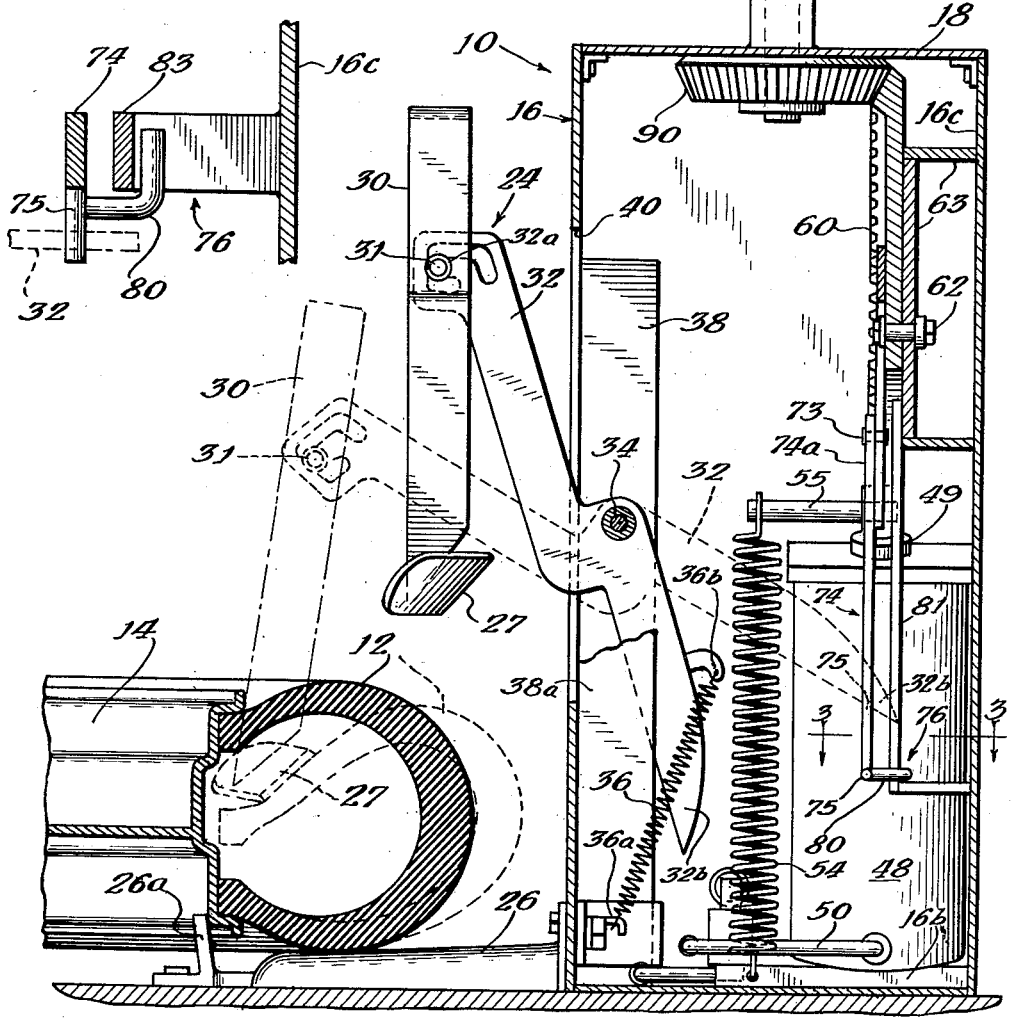

Jan. 12, 1965 R. C. TABORDON 3,165,142
TIRE CHANGING STAND
Filed April 15, 1963 4 Sheets-Sheet 3
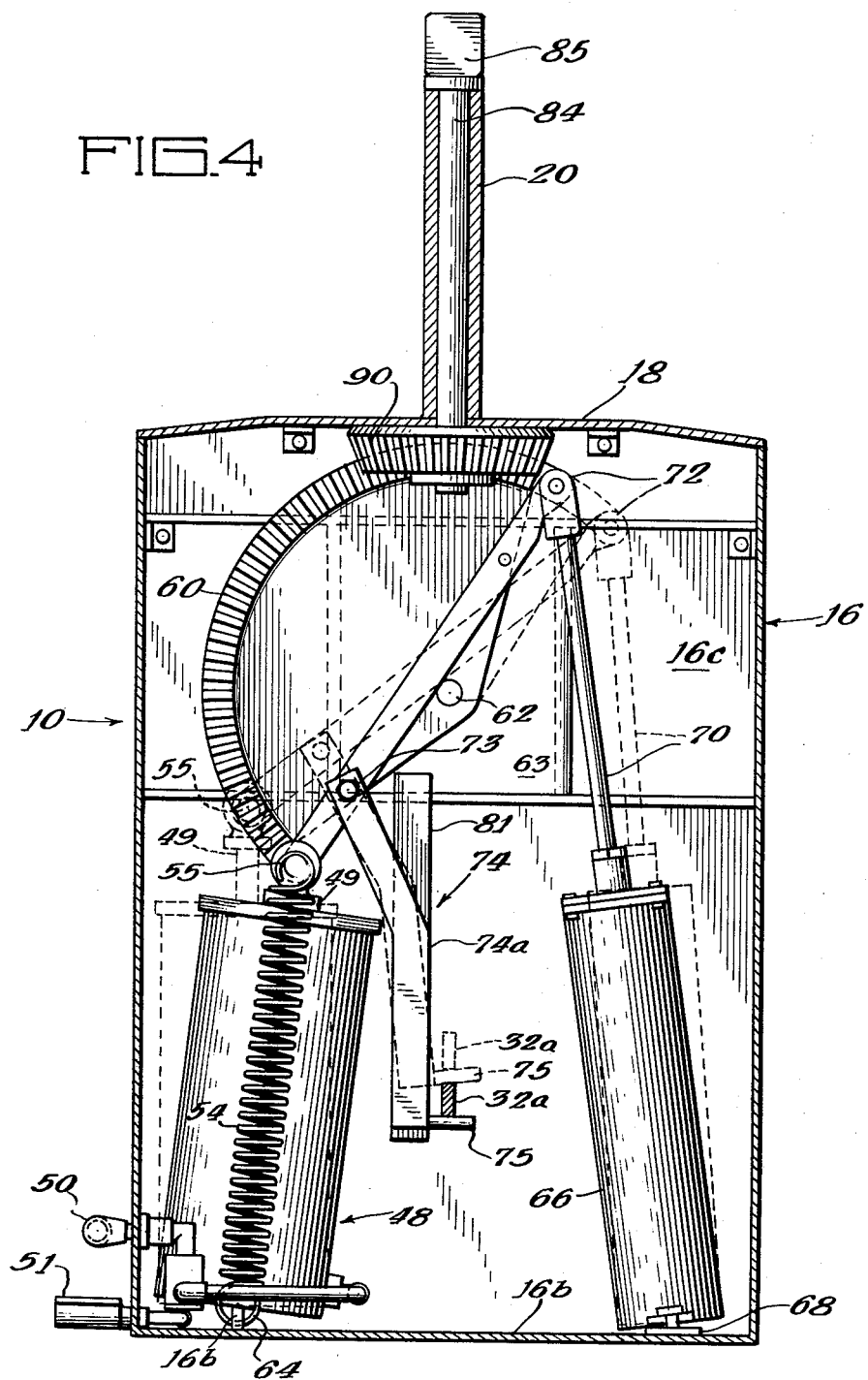

# United States Patent Office 3,165,142
Patented Jan. 12, 1965

3,165,142
TIRE CHANGING STAND
Royal C. Tabordon, Casco, Wis., assignor to The Coats Company, Inc., a corporation of Iowa
Filed Apr. 15, 1963, Ser. No. 273,142
11 Claims. (Cl. 157—1.17)

This invention relates to tire changers and more particularly to a new and improved drive mechanism for tire changers.

Tire changers are most often employed in automobile service stations or the like where there is a ready supply of compressed air. Therefore it is desirable to use compressed air, through the aid of a piston and cylinder device, to drive the mechanism of the tire changer. Tire changers must perform the function of breaking the bead of the tire away from the tire rim and then lifting the bead of the tire over the rim or replacing the same when the new tire is installed. Thus it is further desirable to use only one motive source to drive the mechanism for performing all these functions. In particular, the bead breaking shoes generally are activated by a linear type stroke, but the tire tool drive shaft must be activated by force which rotates the drive shaft through at least a major portion of 360° so that the tire tool may push or pull the tire bead over the entire periphery of the wheel rim. Heretofore most means for driving both the bead breaker and the tire tool drive shaft has been through the use of separate drive systems for each, or by means of a pulley and cable system in association with a single power source.

It is therefore a primary object of this invention to provide a new and improved tire changer.

It is another object of this invention to provide a new and improved tire changer having improved means for driving all components thereof from a single power source.

It is still another object of this invention to provide a new and improved tire changer utilizing air under pressure to drive a piston and cylinder device therein which is operably associated with a bead breaking shoe for activating the same and is further operably associated through improved means with a tire tool drive shaft for rotating the same.

It is yet another object of this invention to provide a new and improved tire changer having a piston and cylinder device for supplying motive power to the components thereof and having therein improved means for changing the linear motion of the piston and cylinder device into rotation of the tire tool drive shaft.

Other objects, features and advantages of the present invention will be apparent from the following description of the preferred embodiment illustrated in the accompanying drawings, in which:

FIGURE 1 is a front elevational view in partial phantom outline of the tire changer embodying this invention;

FIGURE 2 is a section view of the tire changer of FIGURE 1 taken along the line 2—2 thereof;

FIGURE 3 is an enlarged fragmentary section view taken along the line 3—3 of FIGURE 2;

FIGURE 4 is a section view of the tire changer of this invention taken along the line 4—4 of FIGURE 1.

Figure 5:
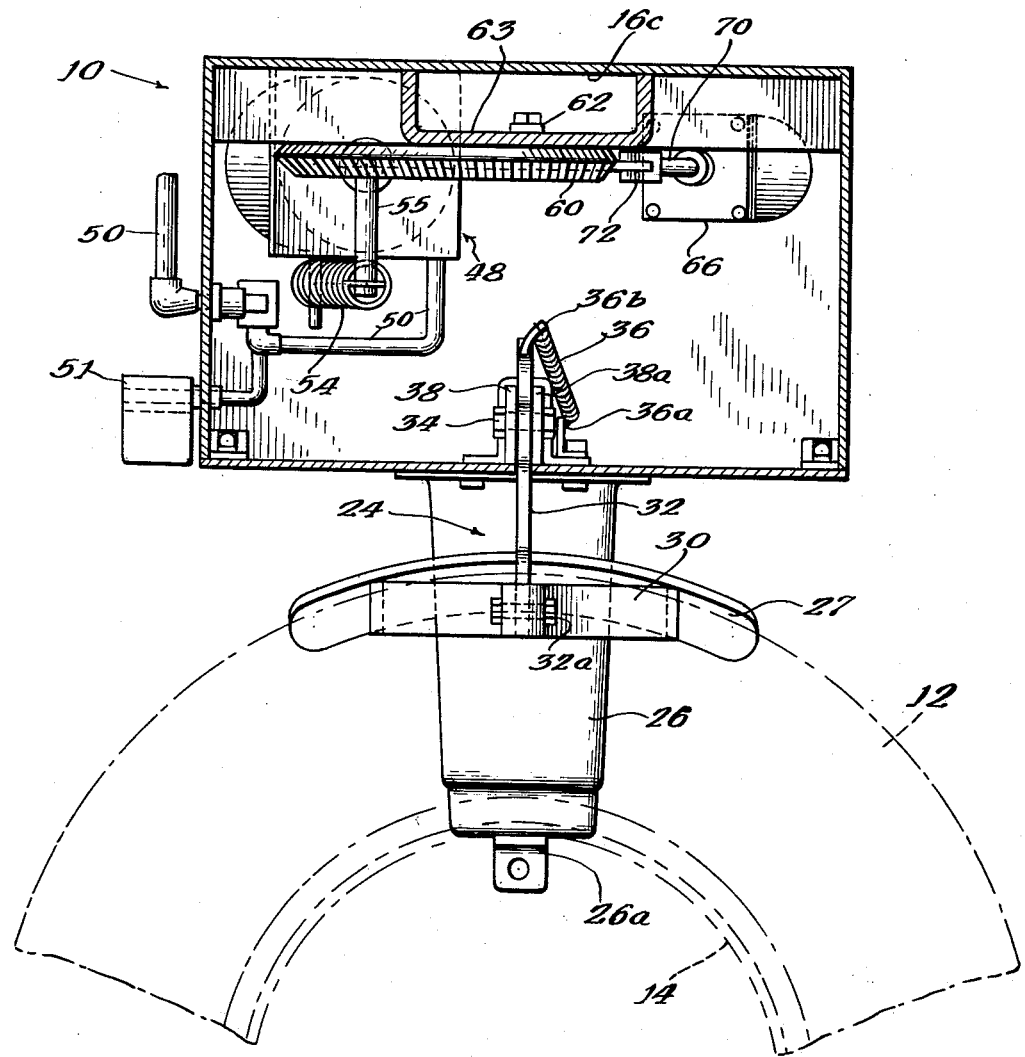
FIGURE 5 is a section view of the tire changer of this invention taken along the line 5—5 of FIGURE 2.

In FIGURE 1 the tire changer 10 of this invention is shown in use with a tire 12 mounted on a rim 14. The tire changer includes a generally box-like body 16 having a generally horizontal tire supporting platform 18 at the top thereof on which the tire and rim rest at one stage of the tire changing operation. Extending upwardly through the top of the tire supporting platform is a substantially upright spindle 20 which also extends through the open center of the wheel rim when a tire is placed on the supporting platform. A tire hold down device 22 is secured to the spindle after the tire has been placed on the supporting platform to rigidly secure the tire thereto.

A bead breaking device 24 is positioned on one side of this tire changer and is used in conjunction with a rim holder 26 which extends outwardly from one side of the base of the tire changer. The bead breaker breaks the bead of a tire away from the rim thereof when the tire and rim are held as shown in FIGURE 2. The rim holder 26 has an upstanding flange 26a which is positioned generally to the interior of the wheel rim and maintains the wheel rim and tire in a proper relation to the tire changer body so that the bead breaker 24 may adequately perform this function.

The bead breaker 24 includes a bead breaker shoe 27 which is an arcuate convex bar secured at the free ends of a Y-shaped arm 30 mounted on a generally Z-shaped lever 32. The arm 30 is secured to the lever at 32 in a notch and bolt assembly 32a. The arm may be selectively positioned within the notch to change the relative position of the bead breaker shoe and thus adapt the tire changer for use with different sized tires. The lever 32 is pivotally secured at 34 by means of a suitably placed bolt and nut between two upstanding support rails 38 and 38a positioned on the interior of the front wall 16a of the body and an appropriate slot 40 is formed in the side wall 16a of the body to allow the lever arm to extend therethrough. A spring 36 is secured at one end 36a to a hook 37 on the interior of the body of the tire changer and at the other end 36b to a hook 33 extending outwardly from the lever and acts to keep the lever so positioned so that when the tire changer is inoperative the bead breaker is held spaced above the tire holder and closely adjacent the side wall 16a in the position shown in FIGURES 1 and 2.

A piston and cylinder device 48 is positioned in the interior of the body of the tire changer and has a generally linearly movable piston rod 49 which is adapted to travel outwardly therefrom in response to air under pressure which is fed to the piston and cylinder device by means of the air supply and return conduit 50. This air comes from a source of compressed air which is usually found in service stations, garages or the like. A foot pedal 51 is operably associated with the air supply 50 for selective actuation of the cylinder.

The piston is biased against its normal upward path of travel by means of a return spring 54 which is mounted to the base 16b of the body 16 parallel to the piston and operatively associated therewith by a transversely extending bar 55 joining the two, which spring serves to maintain the piston normally in an at rest position, or fully retracted within the air cylinder as shown in FIGURES 2 and 4.

The piston rod is pivotally secured at 58 to one end of a generally crescent-shaped arcuate gear segment 60 which gear is pivotally mounted, as at 62, to a mounting frame 63 secured to and spaced from the interior wall 16c of the body of the tire changer. The gear 60 is adapted to rock through an arc less than 180° about its pivotal mounting in response to linear movement of the piston rod upon actuation of the cylinder by means of the foot pedal 51. The piston and cylinder device is also pivotally mounted, as at 64, to the base 16b of the tire changer so as to enable the piston rod to generally follow the path of the periphery traced by the segmental gear on the upstroke of the piston rod.

A retarding device 66 is similarly pivotally secured to the base 16b, as at 68, opposite the piston and cylinder device and has a rod 70 which is pivotally secured to the end of the arcuate gear 72 opposite the mounting of the piston rod thereto, which serves to cushion or dampen the upstroke of the piston rod and control the speed thereof.

Pivotally secured to the gear at 73 intermediate the mounting of the piston rod thereto and the attachment of the gear to the frame is a generally depending bead breaker driving means 74. The driving means 74 comprises an angled arm member or depending link 74a which is pivotally secured to and depends freely from the segmental gear to travel generally vertically in response to the actuation of the gear. The arm has a pin 75 extending transversely thereto near the bottom thereof which pin is adapted to engage the free end 32b of the lever 32 after the bead breaker has been initially positioned against the side of the tire. The link will force the lever arm upward in response to actuation of the piston and cylinder to effectuate the performance of the bead breaking function as shown in phantom outline in FIGURE 2.

In order to keep the link in a substantially linear vertical path of travel and to restrain it from swinging as a free arm about its pivotal mounting with the crescent gear, a guide means 76 is provided. Guide means 76 consists of an upright guide bar 78 extending generally parallel to the arm 74a and secured to and spaced from the wall 16d of the body of the tire changer. The arm 74a is provided with a hook 80 secured to the pin at the bottom end thereof which hook extends outwardly therefrom and thence inwardly, parallel to the arm 74a, as shown in greater detail in FIGURE 3. A restraining bar 81 mounted on the rear wall 16c and spaced therefrom closely adjacent to the arm 74a, between the arm and the hook 81 to prevent the arm from swinging in pendulum fashion as the gear 60 pivots about its mounting. Thus when this arm is brought upward by the crescent gear in response to the actuation of the piston and cylinder device to drive the bead breaker or tire tool, the hook will prevent the arm from swinging rearwardly as would be the normal tendency thereof, and maintain the pin 75 in driving engagement with the bead breaker arm 32 if the aforesaid arm is operably positioned for engagement therewith.

The spindle 20 is secured to the top of the tire changer 10 and has a rotatable tire tool drive shaft 84 journaled therein. The top of the tire tool drive shaft extends upwardly out of its housing with the spindle and has a generally rectangular flat sided configuration, such as 85, adapted to receive a tire tool 86 having a substantially rectangular slot therein (not shown) and to drive the tool about the periphery of the wheel rim held thereon, in response to the rotation of the tire tool drive shaft.

The tire tool drive shaft extends to the interior of the frame of the tire changer below the tire support platform. Mounted at this interior end of the tire tool drive shaft is a bevel gear 90 which has teeth adapted to mesh with the teeth of the segmental or crescent gear to rotatably drive the tire tool drive shaft in response to the linear movement of the piston and cylinder piston rod. As the piston rod moves on its upstroke and pivots the crescent gear about its pivotal mounting, this gear engages the teeth of the tire tool drive shaft gear to cause the tire tool drive shaft to rotate, thus enabling the tire tool to effectively perform its function. The relative ratio of the crescent gear and drive shaft gear is such that when the linear stroke of the piston rod rocks the crescent gear through an arc less than 180°, the drive shaft gear is driven through an arc of close to 360° so that the tire tool 87, which is secured to the tool drive shaft, may be rotated about the wheel rim for progressively mounting or demounting a tire.

When removing a tire from a tire rim, after the beads have been broken, it is necessary to pry the bead over the tire rim. To accomplish this prying function the tire tool is provided with a prying end 87 which is adapted for engagement with the tire bead. By means of the slot, the tire tool is secured to the end of the tire tool drive shaft, and the rotation of the shaft effectuates the prying of the entire tire bead over the tire rim. Obviously, when a new tire is being installed it is necessary to guide the bead back under the tire rim. Similarly the tire tool has an opposite end for performing this function which pushes the bead back over the rim upon rotation of the drive shaft.

The tire changer of this invention provides a relatively simple bead breaker and tire tool drive mechanism driven by a pneumatic piston and cylinder device adapted to use compressed air as a source of power. The pivotally mounted crescent gear, in combination with the bevel gear at the end of the tool drive shaft, and the relative gear ratio of the two provide a means for rotating the tool drive shaft through about 360° in response to the linear push-pull stroke of the piston rod. The depending link on the crescent gear and free end of the bead breaker lever afford a means for selective, operable engagement between the piston rod and bead breaker to drive the bead breaker shoe for loosening the tire bead from the tire rim. The component drive structure is relatively economical to produce and simple to assemble enhancing the economy of this tool changer. Furthermore, the structure is relatively simple in nature, affording reliability of operation of the tire changer.

The foregoing detailed description has been given for clearness of understanding only, and no unnecessary limitations should be understood therefrom, for some modifications will be obvious to those skilled in the art.

I claim:

1. A power operated tire changer for vehicular tires, comprising: a tire changing stand having a platform for holding a wheel rim thereon; a spindle on said platform extending generally through the center of said rim with the outer end thereof exposed; a rotatable tire tool driving shaft journaled in said spindle and having an exposed end for engaging a tire mounting and demounting tool and driving the tool peripherally of the wheel rim for progressively mounting and demounting of a tire thereon; drive means for said rotatable shaft including gear means on said rotatable shaft and swingable gear segment means pivotally mounted in mesh with said shaft gear means, a pneumatic piston and cylinder device within said stand connected with said gear segment means to rock said segment means through an arcuate path about its pivotal mounting and rotate said tool driving shaft thereby, bead breaker means operably associated with said drive means for selective engagement therewith to loosen the tire bead from the tire rim and prepare the tire for demounting from said rim, said bead breaker means comprising a depending shoe mounted on a swingable lever having a free end, said tire changer including a depending link on said gear segment so that the free end of said lever is selectively engageable with the free end of said link to move said bead breaker shoe toward said tire upon actuation of said piston and cylinder device.

2. The tire changer of claim 1 wherein said swingable lever is pivotally mounted to said tire changing stand and the free end of said lever is positioned in the interior of said stand, and wherein said depending link is provided with a finger at the free end thereof for selective engagement with the lever free end upon actuation of said piston and cylinder device.

3. The tire changer of claim 2 including means for limiting lateral movement of said link upon actuation of said piston and cylinder device.

4. A power operated tire changer for vehicular tires, comprising: a tire changing stand having a platform for holding a wheel rim thereon; a spindle on said platform extending generally through the center of said rim with the outer end thereof exposed; a rotatable tire tool driving shaft journaled in said spindle and having an exposed end for engaging a tire mounting and demounting tool and driving said tool peripherally of the wheel rim for progressively mounting and demounting of a tire thereon; drive means for said rotatable shaft including a gear mounted on said rotatable shaft generally normal thereto and a swingable gear segment pivotally mounted upright on the interior of said stand in mesh with said shaft gear, and a pneumatic piston and cylinder device within said stand connected with the gear segment to rock said segment through an arcuate path and rotate said tool driving shaft in response to linear push-pull motion of said piston and cylinder device; bead breaker means operably associated with said drive means including a bead breaker shoe mounted on a lever pivotally secured to said stand, said lever having a free end extending into the interior of the stand, a depending link pivotally secured to said gear segment and having a finger thereon for selective engagement with the free end of said bead breaker lever to move said lever and its bead breaker upon actuation of said piston and cylinder device said lever and bead breaker being positioned on said tire changing stand to engage a tire on a wheel rim placed beside the stand below the bead breaker shoe.

5. A stand for holding an automotive wheel rim for tire mounting and demounting purposes, comprising: an upstanding frame having wheel rim supporting means including a platform and a spindle extending outwardly from the platform in a position to receive the wheel rim positioned about the spindle, fastening means secured to the spindle to clamp the wheel rim against the platform; a tire tool driving shaft rotatably supported in said spindle and having an outer exposed end for engaging a tire tool; and drive means for said tool driving shaft including gear means on said shaft, a swingably mounted gear segment in mesh with said gear means, a pneumatic piston and cylinder device pivoted to said gear segment and frame for rocking the segment through an arc less than 180° with said gear means and gear segment having a ratio to provide greater rotation of said shaft whereby a tire tool engaging said shaft exposed end may be rotated about a wheel rim for progressively mounting or demounting a tire relative to said shaft, bead breaker means operably associated with said drive means for selective engagement therewith to loosen the tire bead from the tire rim and prepare the tire for demounting from said rim, said bead breaker means comprising a depending shoe mounted on a swingable lever having a free end, said tire changer including a depending link on said gear segment so that the free end of said lever is selectively engageable with said link to move said bead breaker shoe toward said tire upon actuation of said cylinder and piston device.

6. The tire changer of claim 5 wherein said swingable lever is pivotally mounted to said tire changing stand and the free end of said lever is positioned in the interior of said stand, and wherein said depending link is provided with a finger at the free end thereof for selective engagement with the lever free end upon actuation of said piston and cylinder device.

7. The tire changer of claim 6 including means for limiting lateral movement of said link upon actuation of said piston and cylinder device.

8. A power operated tire changer for vehicular tires, comprising: a tire changing stand having a platform for holding the wheel rim thereon; a spindle on said platform extending generally through the center of said rim with the outer end thereof exposed; a rotatable tire tool driving shaft journaled in said spindle and having an exposed end for engaging a tire mounting and demounting tool and driving said tool peripherally of the wheel rim for progressively mounting and demounting a tire thereon; drive means for said rotatable shaft including a gear mounted on said rotatable shaft spaced from said exposed end and a swingable gear segment pivoted to said stand in mesh with said gear to drive said shaft in one direction upon arcuate movement of said gear segment in one direction and to drive said shaft in the opposite direction upon arcuate movement of said segment in the opposite direction, said drive means further including a power device having a linearly movable member coupled to said segment so that substantially linear motion of said linearly movable member will cause arcuate movement of said segment and thereby drive the said shaft; and bead breaker means selectively engageable with said power means to loosen the tire bead from the tire rim.

9. A power operated tire changer for vehicular tires, comprising: a tire changing stand having a platform for holding the wheel rim thereon; a spindle on said platform extending generally through the center of said rim with the outer end thereof exposed; a rotatable tire tool driving shaft journaled in said spindle and having an exposed end for engaging a tire mounting and demounting tool and driving said tool peripherally of the wheel rim for progressively mounting and demounting a tire thereon; drive means for said rotatable shaft including a gear mounted on said rotatable shaft spaced from said exposed end and a swingable gear segment pivoted to said stand in mesh with said gear to drive said shaft in one direction upon arcuate movement of said gear segment in one direction and to drive said shaft in the opposite direction upon arcuate movement of said segment in the opposite direction, said drive means further including a power device having a linearly movable member coupled to said segment so that substantially linear motion of said linearly movable member will cause arcuate movement of said segment and thereby drive the said shaft; and bead breaker means operably associated with said drive means including a bead breaker shoe mounted on a lever pivotally secured to said stand, said lever having a free end extending into the interior of the stand, a depending link pivotally secured to said gear segment and having a finger thereon for selective engagement with the free end of said bead breaker lever to move said lever and its bead breaker upon actuation of said piston and cylinder device, said lever and bead breaker being positioned on said tire changing stand to engage a tire on a wheel rim placed beside the stand below the bead breaker shoe.

10. A power operated tire changer for vehicular tires, comprising: a tire changing stand having a platform for holding a wheel rim thereon; a spindle on said platform extending generally through the center of said rim with the outer end thereof exposed; a rotatable tire tool driving shaft journaled in said spindle and having an exposed end for engaging a tire mounting and demounting tool and driving the tool peripherally of the wheel rim for progressively mounting and demounting of a tire thereon; drive means for said rotatable shaft including a gear on said shaft at the end opposite from said exposed end and a pivoted gear segment in mesh with said gear and in driving relation therewith to drive said shaft in one direction upon arcuate movement of said segment in one direction, and to drive said shaft in the opposite direction upon arcuate movement of said segment in the opposite direction, said drive means further including a piston and cylinder device pivoted to said stand and having a rod which is linearly extensible upon the application of power to the piston and cylinder device, means connecting said rod to said segment to translate the generally linear motion of the rod into arcuate motion of the segment and bead breaker means selectively engageable with said power means to loosen the tire bead from the tire rim.

11. The tire changer of claim 10 including bead breaker means operably associated with said drive means for selective engagement therewith to loosen the tire bead from the tire rim and prepare the tire for demounting from said rim, said bead breaker means including a bead breaker shoe mounted on a lever which is selectively engageable with said actuation drive means so that actuation of said piston and cylinder device may move said bead breaker shoe into bead breaking engagement with said tire.

References Cited in the file of this patent

UNITED STATES PATENTS

| | | |
|---|---|---|
| 2,546,988 | Eberly | Apr. 3, 1951 |
| 2,912,047 | Douglas et al. | Nov. 10, 1959 |
| 3,032,094 | Bishman | May 1, 1962 |
| 3,042,090 | Foster | July 3, 1962 |
| 3,084,728 | Brosene | Apr. 9, 1963 |